(12) United States Patent
Han et al.

(10) Patent No.: US 10,365,939 B2
(45) Date of Patent: Jul. 30, 2019

(54) METHOD AND APPARATUS FOR PROVIDING OPERATING SYSTEM BASED ON LIGHTWEIGHT HYPERVISOR

(71) Applicant: ELECTRONICS AND TELECOMMUNICATIONS RESEARCH INSTITUTE, Daejeon (KR)

(72) Inventors: Seung-Hun Han, Daejeon (KR); Jung-Hwan Kang, Boryeong-si (KR); Wook Shin, Daejeon (KR); Hyoung-Chun Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 306 days.

(21) Appl. No.: 15/138,542

(22) Filed: Apr. 26, 2016

(65) Prior Publication Data

US 2017/0153908 A1    Jun. 1, 2017

(30) Foreign Application Priority Data

Dec. 1, 2015 (KR) .................. 10-2015-0170172

(51) Int. Cl.
*G06F 9/455* (2018.01)
*G06F 21/52* (2013.01)
*G06F 21/55* (2013.01)

(52) U.S. Cl.
CPC .......... *G06F 9/45558* (2013.01); *G06F 21/52* (2013.01); *G06F 21/55* (2013.01);
(Continued)

(58) Field of Classification Search
None
See application file for complete search history.

(56) References Cited

U.S. PATENT DOCUMENTS 8,578,483 B2   11/2013   Seshadri et al.
8,984,629 B2   3/2015    Kim et al.
(Continued)

FOREIGN PATENT DOCUMENTS

JP   2009-512939 A     3/2009
KR   10-2010-0089968 A  8/2010
(Continued)

OTHER PUBLICATIONS

Arvind Seshadri et al., "SecVisor: A Tiny Hypervisor to Provide Lifetime Kernel Code Integrity for Commodity OSes," ACM SOSP'Oct. 7, 2007.

*Primary Examiner* — Henry Tsang
(74) *Attorney, Agent, or Firm* — LRK Patent Law Firm

(57) ABSTRACT

A method and apparatus for providing an operating system based on a lightweight hypervisor. An electronic device includes a hypervisor, an operating system monitor, and a virtualized operating system. The hypervisor enables the virtualized operating system and a physical machine to share the resources of the physical machine. If the virtualized operating system accesses the resource, the operating system monitor determines whether to allow the access to the resource. Also, the operating system monitor verifies the integrity of the virtualized operating system and determines whether a threat to the virtualized operating system exists.

18 Claims, 10 Drawing Sheets

(52) U.S. Cl.
CPC .............. *G06F 2009/45579* (2013.01); *G06F 2009/45587* (2013.01); *G06F 2009/45591* (2013.01); *G06F 2221/033* (2013.01)

(56) References Cited

U.S. PATENT DOCUMENTS

| | | | |
|---|---|---|---|
| 9,286,105 B1* | 3/2016 | Levchenko | G06F 9/45558 |
| 2008/0082722 A1* | 4/2008 | Savagaonkar | G06F 21/56 |
| | | | 711/6 |
| 2008/0127348 A1 | 5/2008 | Largman et al. | |
| 2009/0125902 A1* | 5/2009 | Ghosh | G06F 9/45533 |
| | | | 718/1 |
| 2009/0183180 A1* | 7/2009 | Nelson | G06F 9/45533 |
| | | | 719/319 |
| 2010/0122343 A1* | 5/2010 | Ghosh | G06F 21/55 |
| | | | 726/23 |
| 2011/0004935 A1* | 1/2011 | Moffie | G06F 21/53 |
| | | | 726/23 |
| 2014/0283076 A1* | 9/2014 | Muttik | G06F 21/554 |
| | | | 726/24 |
| 2017/0308403 A1* | 10/2017 | Turull | G06F 9/4887 |

FOREIGN PATENT DOCUMENTS

| | | |
|---|---|---|
| KR | 10-2012-0061249 A | 6/2012 |
| KR | 10-2014-0033349 A | 3/2014 |
| KR | 10-2014-0071205 A | 6/2014 |
| NO | 2012/135192 A2 | 10/2012 |

\* cited by examiner

METHOD AND APPARATUS FOR PROVIDING OPERATING SYSTEM BASED ON LIGHTWEIGHT HYPERVISOR

CROSS REFERENCE TO RELATED APPLICATION

This application claims the benefit of Korean Patent Application No. 10-2015-0170172, filed Dec. 1, 2015, which is hereby incorporated by reference in its entirety into this application.

BACKGROUND OF THE INVENTION

1. Technical Field

The following embodiments relate generally to a virtualized operating system and, more particularly, to a method and apparatus for providing an operating system based on a lightweight hypervisor.

2. Description of the Related Art

Virtualization technology is technology in which multiple logical machines are created on a physical machine and the created logical machines run individually. Virtualization technology is essential technology in a cloud computing environment.

Virtualization technology comprises a host machine, a guest machine, and a hypervisor. Here, the host machine is a physical machine. The guest machine is a logical machine, i.e. a virtual machine. The hypervisor runs on the host machine and manages the guest machine.

The hypervisor controls the information about, and behavior of, the guest machine. Also, the hypervisor controls the virtual machine and the sharing of physical resources across multiple virtual machines.

A space that is isolated from a physical machine is allocated to a virtual machine. Accordingly, even if the virtual machine is infected with malware, the physical machine is not affected by the infection. This advantage enables virtualization technology to perform important functions in both commercial and open solutions for malware analysis.

Recently, as virtualization technology has been popularized, research for improving security by applying virtual technology to PCs is being conducted. Such research has resulted in the Qubes Operating System (OS), Virtics, and the like. Based on such research, virtualization technology is expected to improve the security of PCs.

However, conventional virtualization solutions, such as a Type I hypervisor and a Type II hypervisor, may impose overhead associated with the allocation of resources for running a virtual machine. Due to such overhead, it may be inefficient to apply such conventional virtualization solutions to PCs.

Meanwhile, conventional virtualization solutions require independent operating systems for each of the physical machine and a virtual machine. Also, in the conventional virtualization solutions, it is necessary to separately allocate some of the resources of the physical machine to the virtual machine in order to run the virtual machine.

Compared to server environments, PC environments have limited resources. Here, the resources may include processors, memory, and disks. In the case of conventional virtualization solutions, the above-mentioned requirements may further limit the resources available to PCs. Consequently, such a limitation of resources may degrade performance of the PCs.

Consequently, in order to successfully introduce a security solution based on virtualization technology into PCs, new technology capable of improving security and minimizing overhead and performance degradation attributable to virtualization is required.

With reference to security for operating systems, U.S. Pat. No. 8,578,483 and Korean Patent Application No. 10-2013-7025864 have been disclosed.

SUMMARY OF THE INVENTION

An embodiment provides a method and apparatus that may reduce the overhead necessary for the use of virtualization technology by employing a lightweight hypervisor in order to protect an operating system against attacks of malware.

An embodiment may provide a method and apparatus that may reduce the overhead necessary for the use of virtualization technology, check the integrity of an operating system, and detect threats to the operating system.

An embodiment provides a method and apparatus that may effectively use a processor that includes multiple processing units for virtualization.

An embodiment provides a method and apparatus that may automatically determine information about the resources on a physical machine. Therefore, the embodiment may be applied not only to PCs but also to servers, which require high performance, and furthermore to a system having an environment in which virtualization technology is provided.

Also, objects to be achieved by the present invention are not limited to the above-mentioned objects, and other objects that have not been mentioned will be clearly understood by those skilled in the art from the following description.

According to an aspect of the present invention, there is provided an electronic device including memory for storing at least one program and a processor for executing the at least one program, wherein the at least one program includes code of a virtualized operating system and code of a hypervisor, the virtualized operating system runs on a virtual machine, the virtualized operating system and an operating system of the electronic device share a resource of the operating system of the electronic device, and the hypervisor controls access by the virtualized operating system to the shared resource.

According to another aspect of the present invention, there is provided an operating method of an electronic device, which includes creating, by the electronic device, a hypervisor, and creating, by the electronic device, a virtualized operating system, wherein the virtualized operating system runs on a virtual machine, the virtualized operating system and an operating system of the electronic device share a resource of the operating system of the electronic device, and the hypervisor controls access by the virtualized operating system to the shared resource.

A processor of the electronic device may include multiple processing units.

Each of the multiple processing units may execute the hypervisor.

The hypervisor and the virtualized operating system may be created in the operating system of the electronic device.

The virtualized operating system may provide an environment identical to an environment provided before virtualization to an application that runs inside the virtualized operating system through sharing of the resource.

In creating the virtualized operating system, an execution flow in the electronic device may continue without interruption from the operating system of the electronic device to an inside of the virtualized operating system.

The operating method may further include running an operating system monitor for monitoring the virtualized operating system.

The operating system monitor may be run using an execution flow that is independent of a scheduler of the operating system.

The operating system monitor may check integrity of the virtualized operating system by monitoring predetermined information associated with the virtualized operating system.

The predetermined information may include at least one of a state of a register of a processor, a state of memory, and a state of a process.

If there is a problem with the integrity of the virtualized operating system, the operating system monitor may determine whether a threat to the virtualized operating system exists.

The operating system monitor may determine whether the threat exists based on information about a behavior of the virtualized operating system.

The operating method may further include recognizing access by the virtualized operating system to a predetermined resource of the electronic device; determining whether to allow the access; and controlling the access based on a result of the determination.

The predetermined resource may include at least one of kernel-level code, kernel-level readable data, kernel-level writable data, kernel-level read-only data, a kernel level table, and a kernel-level register.

Whether to allow the access may be determined based on at least one of a memory space whitelist, a process whitelist, and information about a state of a process.

The access may be recognized by a memory protection function or a register protection function for the resource.

If the access is determined to be abnormal access, an event may be inserted in the virtualized operating system. The event may include at least one of an exception, an interruption, movement of a code execution address, memory information modification, and register resource modification.

The virtualized operating system may run on a virtual machine, and the virtual machine may have an identical environment with a physical machine of the electronic device.

According to a further aspect of the present invention, there is provided a computer-readable storage medium in which a program is recorded, the program including code of a virtualized operating system and code of a hypervisor, wherein the virtualized operating system runs on a virtual machine, the virtualized operating system and an operating system of the electronic device share a resource of the operating system of the electronic device, and the hypervisor controls access by the virtualized operating system to the resource.

Additionally, there may be further provided a computer-readable storage medium storing a computer program for implementing the above-mentioned methods, other methods, devices, and systems.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
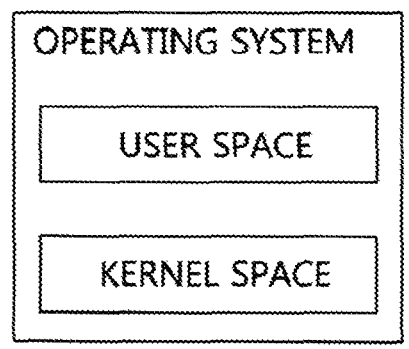
FIG. 1 illustrates the configuration of an operating system before a hypervisor is activated according to an example.

Specific embodiments will be described in detail below with reference to the attached drawings. These embodiments are described in sufficient detail to enable those skilled in the art to practice the present invention. It should be understood that the embodiments differ from each other, but the embodiments do not need to be exclusive of each other. For example, a particular feature, structure, or characteristic described herein in connection with one embodiment may be implemented by another embodiment without departing from the sprit and scope of the present invention. Also, it should be understood that the location or arrangement of individual elements in the disclosed embodiments may be changed without departing from the spirit and scope of the present invention. Therefore, the following detailed description is not to be taken in a limiting sense, and if appropriately interpreted, the scope of the exemplary embodiments is limited only by the appended claims, along with the full range of equivalents to which the claims are entitled.

The same reference numerals are used to designate the same or similar elements throughout the drawings. The shapes, sizes, etc. of components in the drawings may be exaggerated to make the description clear.

The terms used herein are for the purpose of describing particular embodiments only and are not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Also, element modules described in the embodiments of the present invention are independently shown in order to indicate different characteristic functions, but this does not mean that each of the element modules is formed of a piece of separate hardware or a piece of software. That is, element modules are arranged and included for convenience of description, and at least two of the element units may form one element unit or one element may be divided into multiple element units and the multiple element units may perform functions. An embodiment into which the elements are integrated or an embodiment from which some elements are separated is included in the scope of the present invention as long as it does not depart from the essence of the present invention.

Also, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention.

Hereinafter, embodiments of the present invention are described with reference to the accompanying drawings in order to describe the present invention in detail so that those having ordinary knowledge in the technical field to which the present invention pertains can easily practice the present invention.

In the following description of the present invention, detailed descriptions of known functions and configurations which are deemed to make the gist of the present invention obscure will be omitted.

FIG. 1 illustrates the configuration of an operating system before a hypervisor is activated according to an example.

As illustrated in FIG. 1, a computer system may run an operating system. The operating system may be divided into a user space and a kernel space.

Once the operating system is running, a hypervisor according to an embodiment may be executed as will be described later with reference to FIG. 2.

Figure 2:
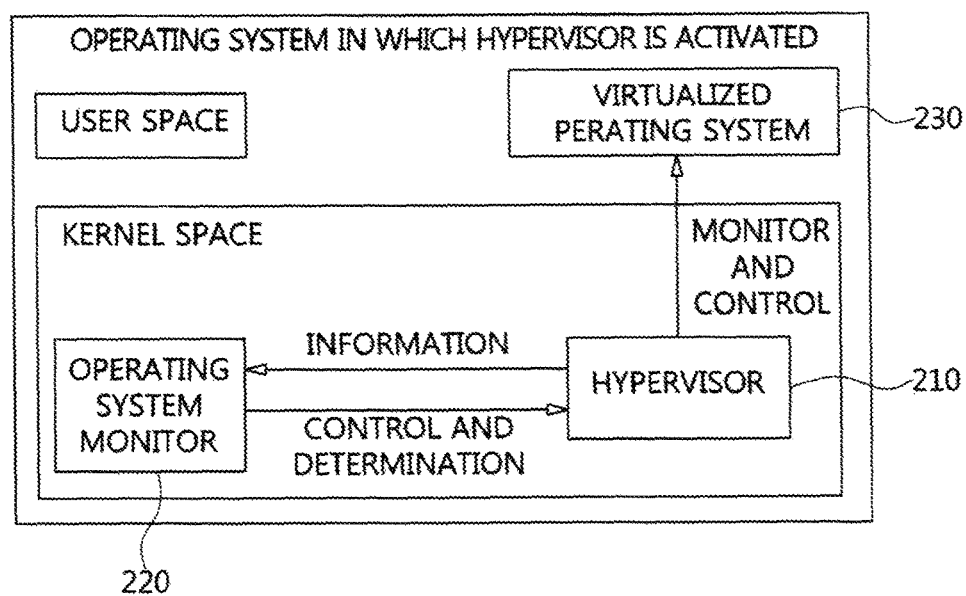
FIG. 2 illustrates the configuration of an operation system in which a hypervisor is activated according to an embodiment.

FIG. 2 illustrates the configuration of an operating system in which a hypervisor is activated according to an embodiment.

As illustrated in FIG. 2, a hypervisor may be activated through virtualization.

In FIG. 2, a system 200 for securing an operating system may include a hypervisor 210, an operating system monitor 220, and a virtualized operating system 230. Also, the system 200 for securing an operating system may include the operating system 240 of a computer system. Here, the hypervisor 210, the virtualized operating system 230, and the operating system monitor 220 may perform a function of securing the operating system.

After the hypervisor 210 and the like are activated, the operating system 240 may include a user space, a kernel space, and the virtualized operating system 230. The kernel space may include the hypervisor 210 and the operating system monitor 220.

Each of the hypervisor 210, the operating system monitor 220, and the virtualized operating system 230 may be created in the operating system 240 of an electronic device 300, which will be described later.

The virtualized operating system 230 and a physical machine may share the resources of the physical machine. Alternatively, the virtualize operating system 230 and the operating system 240 of the electronic device 300 may share the resources of the operating system 240 of the electronic device 300. The hypervisor 210 may control access by the virtualized operating system 230 to the shared resources.

In other words, unlike conventional hypervisors or conventional security systems based on virtualization, the hypervisor 210 may not require a specialized operating system or resources for a virtual machine. Alternatively, unlike conventional hypervisors or conventional security systems based on virtualization, the virtualized operating system 230 may reduce the overhead imposed on a specialized operating system for a virtual machine, and may require fewer resources. Therefore, the hypervisor 210 may be lightweight compared to conventional hypervisors. In the embodiments, the terms "hypervisor 210" and "lightweight hypervisor" may be used as having the same meaning, and they may be interchangeable with each other.

Because the hypervisor 210 does not require a specialized operating system or resources for a virtual machine, there is little overhead associated with the allocation of resources. Therefore, performance degradation attributable to such allocation of resources may be decreased.

The hypervisor 210 may monitor and control the operation of the virtualized operating system 230.

The operating system monitor 220 may operate based on the hypervisor 210. The operating system monitor 220 may determine the operation of the virtualized operating system 230 using information provided from the hypervisor 210, and may control the operation of the virtualized operating system 230.

Also, the operating system monitor 220 may include a plurality of additional systems that operate in conjunction with the hypervisor 210.

The virtualized operating system 230 may be an operating system that runs on a virtual machine.

The functions and/or operations of the hypervisor 210, the operating system monitor 220, the virtualized operating system 230, and the operating system 240 will be described in detail with reference to the following embodiments.

Figure 3:
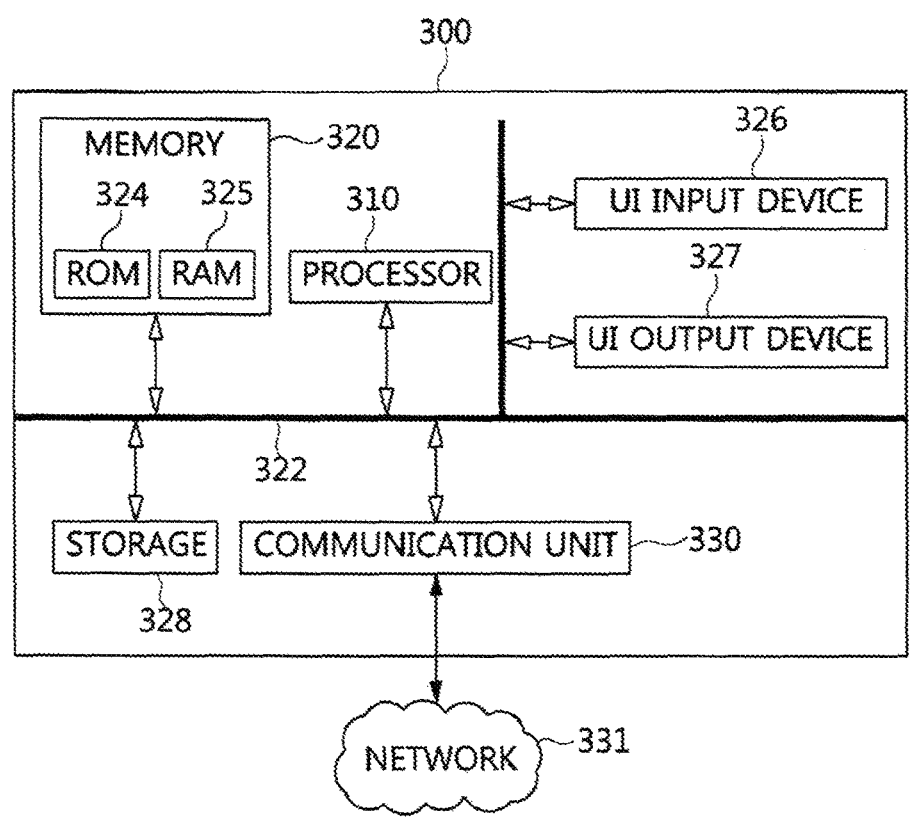
FIG. 3 illustrates the configuration of an electronic device for implementing a system for securing an operating system in an embodiment.

FIG. 3 illustrates the configuration of an electronic device for implementing a system for securing an operating system in an embodiment.

FIG. 3 shows the electronic device for implementing a system 200 for securing an operating system according to an embodiment.

The system 200 for securing an operating system may be implemented as the electronic device 300 illustrated in FIG. 3. The electronic device 300 may be a general-purpose computer system that provides the functions of the system 200 for securing an operating system.

As illustrated in FIG. 3, the electronic device 300 may include a processor 310, memory 320, a User Interface (UI) input device 326, a UI output device 327, and storage 328, which communicate with each other via a bus 322.

Also, the electronic device 300 may further include a communication unit 330 that is connected to a network 331.

The processor 310 may process tasks required for the operation of the electronic device 300. The processor 310 may be a Central Processing Unit (CPU) or a semiconductor device for executing processing instructions stored in the memory 320 or the storage 328.

The communication unit 330 may perform functions related to communication. The communication unit 330 may send and receive data or information, which is required for the operation of the electronic device 300. The communication unit 330 may transmit data to another device over the network 331, and may receive data from the other device. For example, the communication unit 330 may be a network chip or a port.

The memory 320 and the storage 328 may be various types of volatile or nonvolatile storage media. For example, the memory may include at least one of ROM 324 and RAM 325. Also, the memory may include at least one of flash memory and a detachable storage medium.

The system 200 for securing an operating system may be implemented in a computer system that includes a computer-readable storage medium. The storage medium may store at least one program required in order for the electronic device 300 to operate as the system 200 for securing an operating system. The memory 320 may store at least one program. The processor 310 may execute at least one program.

At least one program may include the code of the hypervisor 210, the code of the virtualized operating system 230, and the code of the operating system monitor 220. Also, at least one program may include the code of the operating system 240 of the electronic system 300. Each of the hypervisor 210, the virtualized operating system 230, the operating system monitor 220, and the operating system 240 may be a program. The code may be at least one instruction.

Each of the programs may be included in the electronic device 300 in the form of an operating system, an application module, or other program modules. Each of the programs may perform functions or operations according to an embodiment, or may include routines, subroutines, objects, components, and data structures for implementing abstract data types according to an embodiment.

Programs may be stored in the memory 320 in the form of system programs, applications, or other programs. Also, at least some parts of at least one program may be stored in remote memory, which may communicate with the electronic device 300.

Figure 4:
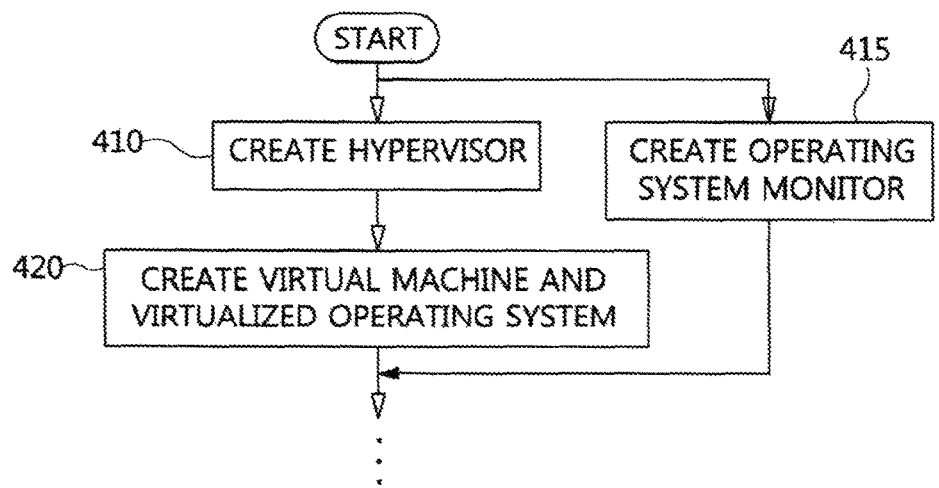
FIG. 4 is a flowchart of a method for operating an electronic device according to an embodiment.

FIG. 4 is a flowchart of a method for operating an electronic device according to an embodiment.

At step 410, a hypervisor may be created. The hypervisor may be created by the operating system 240 of the electronic device 300.

At step 415, an operating system monitor 220 may be created. The operating system monitor 220 may monitor a virtualized operating system 230.

The operating system 240 of the electronic device 300 or the hypervisor 210 may create a scheduler-independent execution flow, which is independent of the scheduler of the operating system 240, through virtualized technology. In creating the scheduler-independent execution flow, the hypervisor 210 may use a preemptive timer of the virtualized technology.

The hypervisor 210 may provide the scheduler-independent execution flow to the operating system monitor 220. For example, the hypervisor 210 may run the operating system monitor 220 using the scheduler-independent execution flow.

At step 420, a virtual machine and a virtualized operating system 230 may be created.

The operating system 240 of the electronic device 300 or the hypervisor 210 may create the virtual machine and the virtualized operating system 230.

The virtualized operating system 230 may be the operating system of the virtual machine.

The virtual machine, which is created by the hypervisor 210, may have the same environment as the physical machine of the electronic device 300. The hypervisor 210 may create a virtual machine having the same environment as the physical machine of the electronic device 300 using virtualization technology.

The virtualized operating system 230 may provide the same environment that was provided before virtualization to an application that runs inside the virtualized operating system 230. Specifically, through resource sharing, the virtualized operating system 230 may provide the same environment that was provided before virtualization to the application that runs inside the virtualized operating system 230.

Because the environment of the virtual machine is the same as that of the physical machine, the hypervisor 210 may easily detect the status of the virtual machine based on the resources of the physical machine. Because the hypervisor 210 easily detects the status of the virtual machine, a semantic gap (that is, any difference between the information about the physical machine and the information about the virtual machine) may be decreased. Owing to the decrease of the semantic gap between the physical machine and the virtual machine, the hypervisor may quickly and accurately detect the status of the virtualized operating system 230.

Also, because the hypervisor 210 easily detects the status of the virtual machine, the semantic gap between the virtualized operating system 230 and the hypervisor 210 may also be decreased.

The virtualized operating system 230 may share kernel space and user space with the physical machine of the electronic device 300.

When the virtualized operating system 230 is created, the execution flow in the electronic device 300 may seamlessly continue from the operating system 240 of the electronic device 300 to the virtualized operating system 230. For example, when the hypervisor 210 creates a virtual machine, the hypervisor 210 may set the position of the code to be executed by the virtualized operating system 230 to the position of the code that immediately follows the code by which the hypervisor 210 was executed. That is, as the position of the code to be executed by the virtualized operating system 230 is set to the position that immediately follows the code by which the hypervisor 210 was executed, the execution flow may continue from the operating system 240 of the physical machine to the virtualized operating system 230. Because the execution flow continues between the operating system 240 of the physical machine and the virtualized operating system 230, the application that is running on the virtualized operating system 230 may not recognize that the environment in which the application is running has switched from the environment of the operating system 240 of the physical machine to the environment of the virtualized operating system 230. In other words, as the execution flow continues between the operating system 240 of the physical machine and the virtualized operating system 230, switching from the environment of the operating system 240 of the physical machine to the environment of the virtualized operating system 230 may be performed without the application that is running on the virtualized operating system 230 being aware of it.

Figure 5:
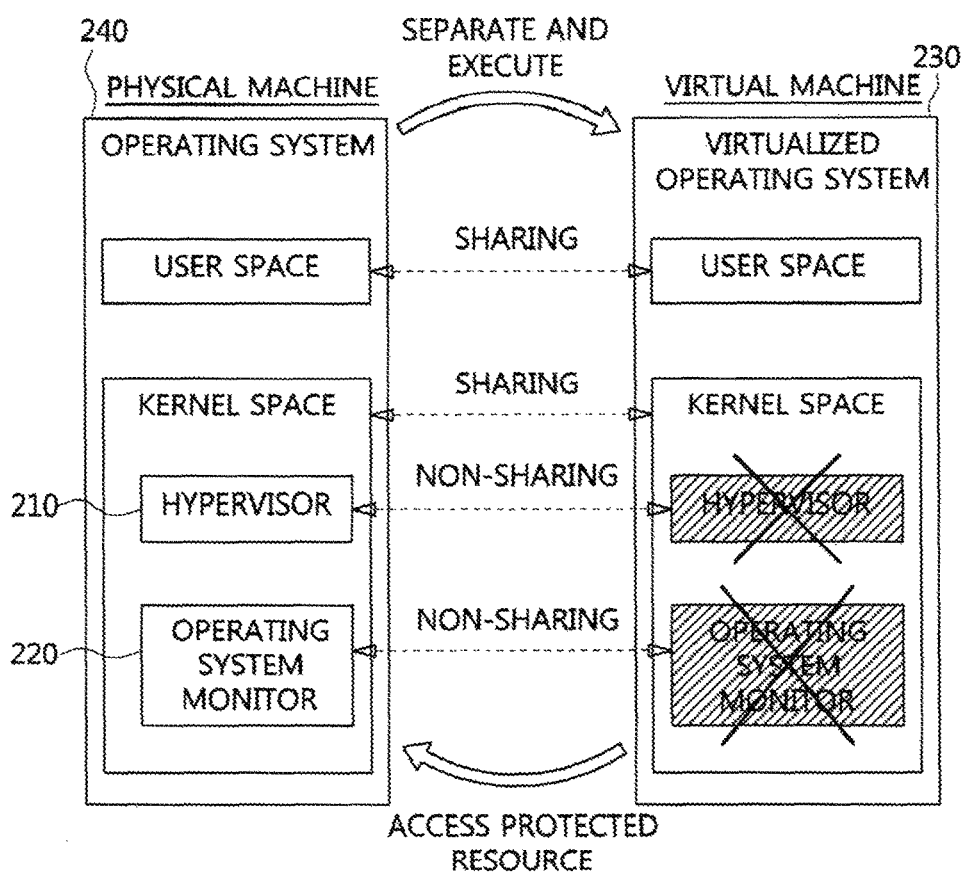
FIG. 5 illustrates a relationship between a physical machine and a virtual machine in the state in which a hypervisor is activated according to an example.

FIG. 5 illustrates the relationship between a physical machine and a virtual machine in the state in which a hypervisor is activated according to an example.

Referring to FIG. 5, after the execution of the hypervisor 210, the operating environment of the operating system 240 may be divided into a physical machine and a virtual machine.

While the virtual machine is running, the virtualized operating system 230 may access protected resources. Here, the protected resource may be a predetermined resource selected from among the resources shared by the operating system 240 of the electronic device 300 and the virtualized operating system 230.

The virtualized operating system 230 may not access the protected resource directly, and access by the virtualized operating system 230 to the protected resource may be controlled by the hypervisor 210 and the operating system monitor 220.

When the virtualized operating system 230 accesses the protected resource, the execution of the virtual machine may temporarily be interrupted. When the execution of the virtual machine is temporarily interrupted, the target to be executed by the processor 310 of the electronic device 300 may switch to the physical machine. When the target to be executed has completely switched to the physical machine, the hypervisor 210 and the operating system monitor 220 in the kernel space may determine whether to allow access to the protected resource. If access is permitted, the access to the resource may be processed. If access is not permitted, a process related to blocking access to the resource may be performed.

The operating system 240 for the physical machine may run on the physical machine. The operating system 240 may include a user space and a kernel space. The user space may be an area in which applications run. The kernel space may be an area in which core functions of the operating system are performed.

The hypervisor 210 and the operating system monitor 220 may be present in the kernel space of the physical machine. The hypervisor 210 and the operating system monitor 220 may run in the kernel space of the physical machine. The kernel of the physical machine may access the hypervisor 210 and the operating system monitor 220.

The virtualized operating system 230 may be present in the virtual machine. The virtualized operating system 230 may run inside the virtual machine. The virtualized operating system 230 may be created such that the user space and the kernel space are shared with the physical machine or the operating system 240 of the physical machine. Also, a change in the status of the virtual machine may be applied without change to the physical machine or to the operating system 240 of the physical machine.

If the hypervisor 210 and/or the operating system monitor 220 are altered in the virtual machine, the function of securing the operating system by the hypervisor 210 and the operating system monitor 220 may be incapacitated. In order to avoid this problem, the hypervisor 210 and the operating system monitor 220 may be excluded from the virtualized operating system 230. That is, the hypervisor 210 and the operating system monitor 220 may not be shared by the virtualized operating system 230.

The virtualized operating system 230 may not itself be aware of its virtualized state. Also, because the virtualized operating system 230 may not be aware of the virtualized state, it may not be aware of the presence of the hypervisor 210 or the operating system monitor 220. Therefore, if the virtualized operating system 230 attempts to access the hypervisor 210 and/or the operating system monitor 220, the access may be regarded as abnormal behavior, and may be processed as unallowable access.

As described above, the difference between the physical machine and the virtual machine may be limited to protection of predetermined resources by the hypervisor 210. Alternatively, the difference between the virtualized operating system 230 and the operating system 240 of the physical machine may be limited to protection of predetermined resources by the hypervisor 210.

Figure 6:
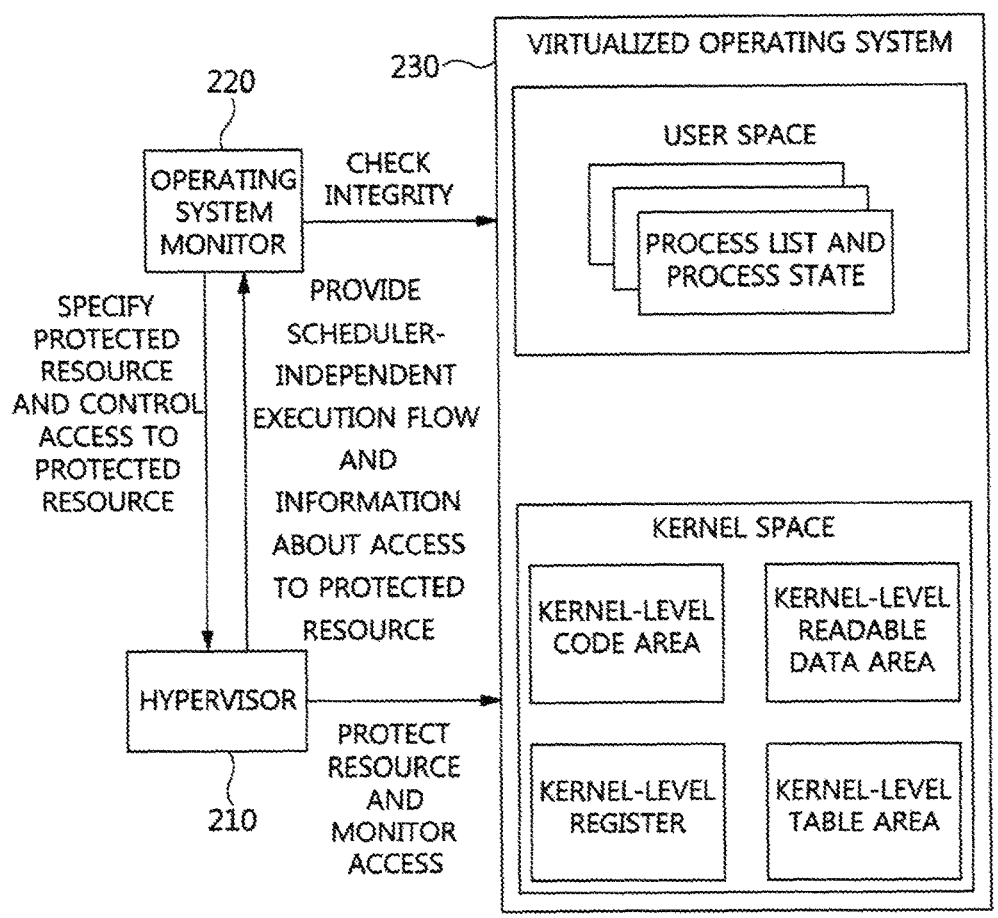
FIG. 6 illustrates the roles of a hypervisor and an operating system monitor according to an example.

FIG. 6 illustrates the roles of a hypervisor and an operating system monitor according to an example.

As illustrated in FIG. 6, the hypervisor 210 and the operating system monitor 220 may communicate with each other. The hypervisor 210 and the operating system monitor 220 may monitor and control the virtualized operating system 230 through communication therebetween.

The hypervisor 210 may provide the operating system monitor 220 with the function of specifying a resource to be protected and the function of monitoring the virtualized operating system 230. The operating system monitor 220 may specify the resource to be protected from the virtualized operating system 230, and may determine whether to allow access to the protected resource.

The protected resource may be an important resource associated with the operation of an operating system. The protected resource may be a resource that plays a key role in the operation of the operating system. For example, the protected resource may be a resource which, if altered by malware, may disable the protection mechanism for the operating system, or may be a resource which, if altered by malware, may cause the operating system to crash.

The protection mechanism for the operating system may include a method in which a kernel level and a user level are separated and privileges according to the level are granted. Also, the protection mechanism of the operating system may include a method in which the integrity of the operating system is checked through inspection performed by the operating system itself. Because the operation of vaccine software for protecting against malware may be based on the protection mechanism of the operating system, it is necessary to protect the resources associated with the operation of the operating system from malware.

For example, the protected resource may include at least one of the resources of a kernel-level code area, the resources of a kernel-level read-only data area, the resources of a kernel-level register, and the resources of a kernel-level table. Alternatively, access to the protected resources may include operations of writing to the kernel-level code area, to the kernel-level read-only data area, to the kernel-level register, and to the kernel-level table.

For example, the protected resource may include at least one of kernel-level code, kernel-level readable data, kernel-level writable data, kernel-level read-only data, a kernel-level table, and a kernel-level register.

When the virtualized operating system 230 accesses the protected resource, the hypervisor 210 may detect the access. When the access is detected, the hypervisor 210 may temporarily interrupt the operation of the virtualized operating system 230. Also, when the access is detected, the hypervisor 210 may collect information about the status of the operating system. Here, the information about the status of the operating system may include information about the status of the virtualized operating system 230 and information about the status of the operating system 240 of the physical machine.

The hypervisor 210 may inform the operating system monitor 220 that the virtualized operating system 230 accesses the protected resource. For example, the hypervisor 210 may provide the operating system monitor 220 with information about the access to the protected resource and information about the status of the operating system.

The hypervisor 210 may create a scheduler-independent execution flow, which is independent of the scheduler of the operating system 240 of the physical machine, and may provide the scheduler-independent execution flow to the operating system monitor 220.

The operating system monitor 220 may determine a resource that must be protected among the resources shared by the physical machine and the virtualized operating system 230. The operating system monitor 220 may designate the determined resource as a protected resource. In order to designate the protected resource, the operating system monitor 220 may use a function provided by the hypervisor 210.

As described above, the hypervisor 210 may provide the operating system monitor 220 with information that is used to determine whether to allow access to a resource.

The operating system monitor 220 may determine whether to allow the virtualized operating system 230 to access the protected resource. For example, the operating system monitor 220 may determine whether to allow the virtualized operating system 230 to access the protected resource using the information provided by the hypervisor 210.

The operating system monitor 220 may send the hypervisor 210 the result of the determination as to whether to allow access to the resource. The hypervisor 210 may perform a process based on the determination by the operating system monitor 220.

The operating system monitor 220 may periodically verify the integrity of the virtualized operating system 230 using the scheduler-independent execution flow provided by the hypervisor 210.

The operating system monitor 220 may verify the integrity of the virtualized operating system 230 using at least one of a list of processes, the state of memory, and the state of processes. Here, the processes may be processes executed on the virtualized operating system 230. Alternatively, the processes may be processes executed on the operating system 240 of the physical machine.

Figure 7:
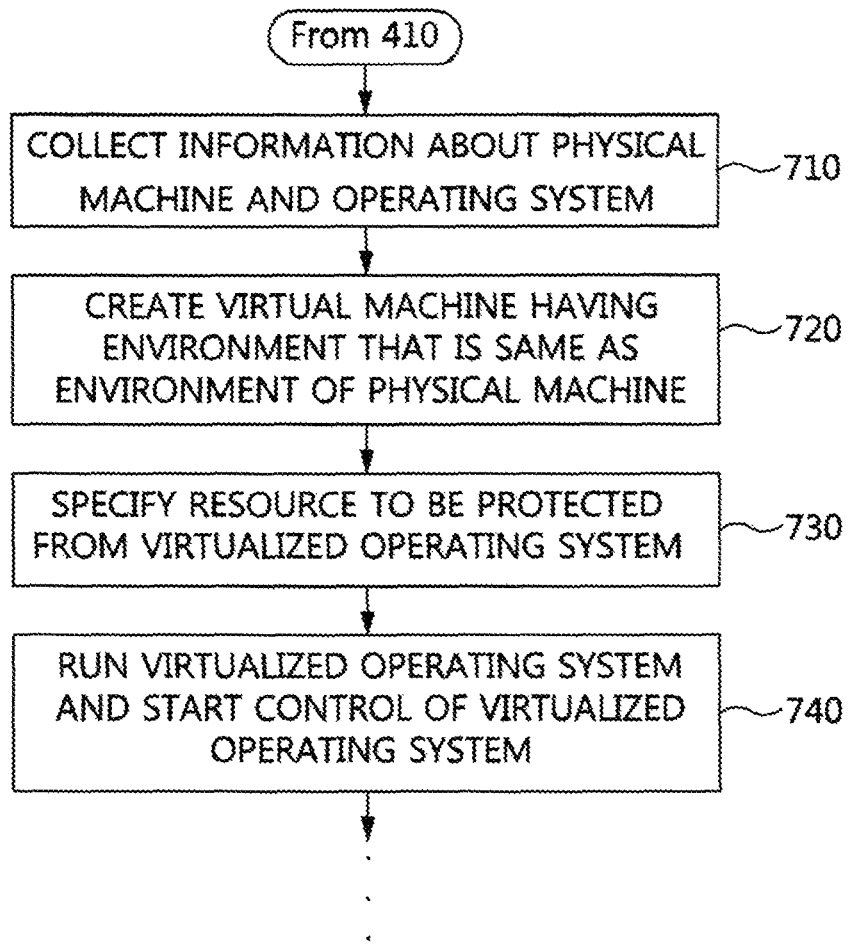
FIG. 7 is a flowchart of a method for securing an operating system according to an example.

FIG. 7 is a flowchart of a method for securing an operating system according to an example.

At step 710, the hypervisor 210 may collect information about the physical machine and information about the operating system 240 running on the physical machine.

At step 720, the hypervisor 210 may create a virtual machine having the same environment as the physical machine of the electronic device 300 based on the collected information.

At step 730, the hypervisor 210 may specify a resource to be protected from a virtualized operating system 230 (that is, a virtual machine) in response to the request by the operating system monitor 220.

When the resource to be protected is specified, the hypervisor 210 may run the virtualized operating system 230, which shares resources with the physical machine, on the virtual machine at step 740.

Also, the hypervisor 210 may start to control the virtualized operating system 230.

The control of the virtualized operating system 230 will be described later with reference to FIG. 8 and FIG. 9.

Step 420, which was described with reference to FIG. 4, may include steps 710, 720, and 730. Step 740 may be included in step 420, or may be performed after step 420.

Figure 8:
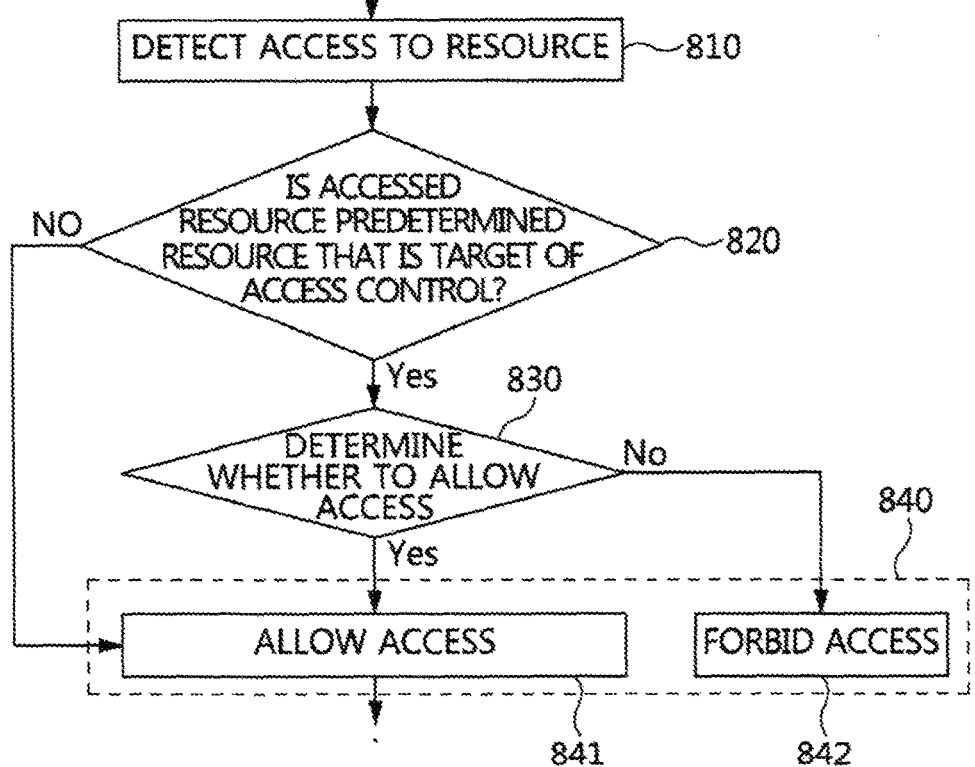
FIG. 8 is a flowchart of a method for controlling access to resources according to an example.

FIG. 8 is a flowchart of a method for controlling access to a resource according to an example.

When the virtualized operating system 230 accesses a resource, the following steps 810, 820, 830, and 840 may be performed. The following steps 810, 820, 830, and 840 may be performed by being combined with the steps described above with reference to another embodiment. For example, the following steps 810, 820, 830, and 840 may be performed after step 420, which was described with reference to FIG. 4, or may be performed after step 740, which was described with reference to FIG. 7.

At step 810, the hypervisor 210 may detect that the virtualized operating system 230 accesses a resource.

The access to the resource may be detected using a memory protection function or a register protection function for the resource.

At step 820, the hypervisor 210 may determine whether the resource accessed by the virtualized operating system 230 is a predetermined resource, which is a target of access control.

At steps 810 and 820, the hypervisor 210 may detect whether the virtualized operating system 230 accesses the predetermined resource of the electronic device 300.

The predetermined resource may be the protected resource that was mentioned above.

If the accessed resource is the predetermined resource, step 830 may be performed. If the accessed resource is not the predetermined resource, step 841 may be performed.

For example, the predetermined resource may include at least one of kernel-level code, kernel-level readable data, kernel-level writable data, kernel-level read-only data, a kernel-level table, and a kernel-level register.

At step 830, the operating system monitor 220 may determine whether to allow access to the predetermined resource.

The hypervisor 210 may provide the operating system monitor 220 with information that is to be used in order to determine whether to allow access to the predetermined resource. The operating system monitor 220 may determine whether to allow access to the predetermined resource using the information provided by the hypervisor 210.

The operating system monitor 220 may determine whether to allow access to the predetermined resource based on information about the status of the virtualized operating system 230 and the like.

For example, the operating system monitor 220 may determine whether to allow access to the predetermined resource based on at least one of a memory space whitelist, a process whitelist, and information about the state of processes.

The operating system monitor 220 may provide the result of the determination to the hypervisor 210.

Based on the result of the determination at step 830, the hypervisor 210 may control access by the virtualized operating system 230 to the predetermined resource at step 840. Also, the hypervisor 210 may resume the interrupted operation of the virtualized operating system 230, depending on the determination of the operating system monitor 220.

Step 840 may include step 841 and step 842.

If the access to the predetermined resource is allowed depending on the result of the determination at step 830, step 841 may be performed. For example, if the operating system monitor 220 determines at step 830 that the access to the predetermined resource is normal access, step 841 may be performed.

If the access to the predetermined resource is not allowed based on the result of the determination at step 830, step 842 may be performed. For example, if the operating system monitor 220 determines at step 830 that the access to the predetermined resource is abnormal access, step 842 may be performed.

At step 841, if the access to the predetermined resource is determined to be normal, the hypervisor 210 may allow the virtualized operating system 230 to access the predetermined resource.

For example, if the operating system monitor 220 determines that the access to the predetermined resource is normal, the hypervisor 210 may resume the interrupted operation of the virtualized operating system 230 in order to allow the access. When the operation is resumed, the virtualized operating system 230 may access the predetermined resource.

At step 842, if the access to the predetermined resource is determined to be abnormal, the hypervisor 210 may not allow the virtualized operating system 230 to access the predetermined resource.

For example, if the operating system monitor 220 determines that the access to the predetermined resource is abnormal access, the hypervisor 210 may interrupt the operation of the virtualized operating system 230.

For example, if the operating system monitor 220 determines that the access to the predetermined resource is abnormal access, the hypervisor 210 may insert an event in the virtualized operating system 230. After the event is inserted, the hypervisor 210 may resume the operation of the virtualized operating system 230. When the operation is resumed, the virtualized operating system 230 may handle the inserted event rather than accessing the predetermined resource. The virtualized operating system 230 may recognize that the access to the predetermined resource is not allowed through the inserted event. Here, the event may include at least one of an exception, an interruption, movement of a code execution address, memory information modification, and register resource modification.

Figure 9:
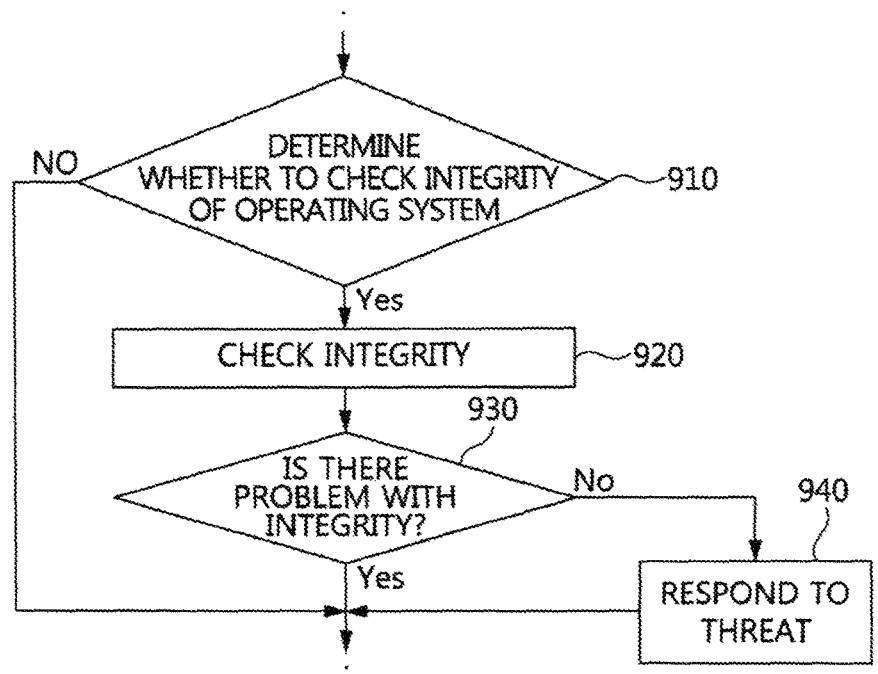
FIG. 9 is a flowchart of a method for verifying the integrity of a virtualized operating system according to an example.

FIG. 9 is a flowchart of a method for verifying the integrity of a virtualized operating system according to an example.

The hypervisor 210 may create a scheduler-independent execution flow, which is independent of the scheduler of the operating system 240, using virtualization technology, and may run the operating system monitor 220 using the scheduler-independent execution flow.

In the following steps 910, 920, 930, and 940, the operating system monitor 220 may periodically check the integrity of the virtualized operating system 230. The following steps 910, 920, 930, and 940 may be performed by being combined with the steps that were described above with reference to another embodiment. For example, the following steps 910, 920, 930, and 940 may be performed after step 420, which was described with reference to FIG. 4, after step 740, which was described with reference to FIG. 7, or after step 840, which was described with reference to FIG. 8.

At step 910, the operating system monitor 220 may determine whether to check the integrity of the virtualized operating system 230.

For example, the operating system monitor 220 may periodically check the integrity of the virtualized operating system 230. The operating system monitor 220 may check the integrity of the virtualized operating system 230 again after a preset time has passed since the integrity of the virtualized operating system 230 was checked.

If it is determined that the integrity of the virtualized operating system 230 is to be checked, step 920 may be performed. If it is determined that the integrity of the virtualized operating system 230 is not to be checked, the process may be terminated.

At step 920, the operating system monitor 220 may check the integrity of the virtualized operating system 230.

The operating system monitor 220 may check the integrity of the virtualized operating system 230 by monitoring predetermined information related to the virtualized operating system 230. For example, the predetermined information may include at least one of the state of a register of a processor, the state of memory, and the state of processes.

At step 930, the operating system monitor 220 may determine whether there is a problem with the integrity of the virtualized operating system 230. If there is no problem with the integrity thereof, the process may be terminated. If there is any problem with the integrity, step 940 may be performed.

If it is determined that there is a problem with the integrity of the virtualized operating system 230, the operating system monitor 220 may deem at step 940 that there is a threat to the virtualized operating system 230, the operating system 240 of the physical machine, or the electronic device 300, and may respond to the threat. For example, if it is determined that there is a problem with the integrity of the virtualized operating system 230, the operating system monitor 220 may interrupt the operation of the virtualized operating system 230 through the hypervisor 210.

Alternatively, if there is a problem with the integrity of the virtualized operating system 230, the operating system monitor 220 may determine at step 940 whether there is a threat to the virtualized operating system 230, the operating system 240 of the physical machine, or the electronic device 300.

The operating system monitor 220 may determine whether there is a threat based on information about the behavior of the virtualized operating system 230. The information about the behavior may include the history information about at least one of the creation of a process, termination of a process, access to a resource, execution of a kernel module, termination of a kernel module, execution of a user library, and termination of execution of a user library. If it is determined that there is a threat to the virtualized operating system 230, the operating system monitor 220 may interrupt the operation of the virtualized operating system 230 through the hypervisor 210.

Figure 10:
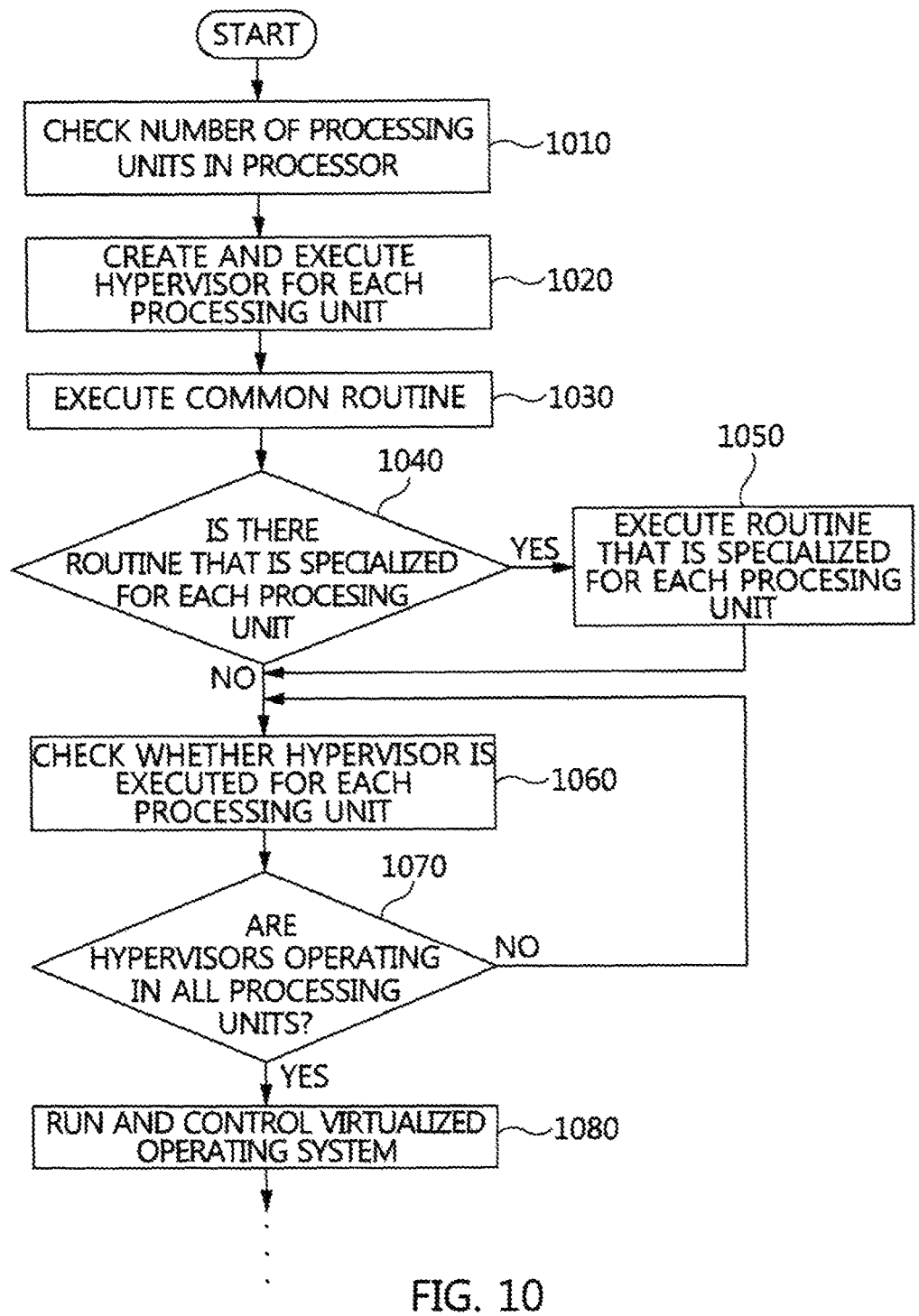
FIG. 10 is a flowchart of a method for executing a hypervisor using multiple processing units according to an example.

FIG. 10 is a flowchart of a method in which multiple processing units run a hypervisor according to an example.

Step 740, which was described with reference to FIG. 7, may include steps 1010, 1020, 1030, 1040, 1050, 1060, 1070, and 1080, which will be described later. Also, at least some of steps 1010, 1020, 1030, 1040, 1050, 1060, 1070, and 1080, which will be described later, may be performed by the operating system 240 of the electronic device 300 or by the processor 310 of the electronic device 300.

The processor 310 of the electronic device 300 may include multiple processing units. Each of the multiple processing units may run the hypervisor 210. The following steps 1010, 1020, 1030, 1040, 1050, 1060, 1070, and 1080 describe the method by which each of the multiple processing units runs the hypervisor 210.

At step 1010, the hypervisor 210 may check the number of processing units in the processor 310 using the collected information about the physical machine.

The collected information about the physical machine may be the information collected at step 710, which was described with reference to FIG. 7. The collected information about the physical machine may include the number of processing units.

If the processing unit comprises multiple processing units, steps 1020, 1030, 1040, 1050, 1060, 1070, and 1080 may be performed for the multiple processing units.

At step 1020, the hypervisor 210 may create and run a hypervisor 210 for each of the processing units. The hypervisor 210 may be allocated to each of the processing units. In other words, at step 1020, hypervisors of the processing units may be created, and the created hypervisors may be run. Through step 1020, the execution of the hypervisor 210 may be separated for each of the processing units.

At step 1030, the hypervisors of the processing units may execute a common routine.

At step 1040, the hypervisor 210 of each of the processing units may determine whether there is a routine specialized for that processing unit.

At step 1050, if a routine specialized for the processing unit exists, the processing unit may separately execute the routine.

At step 1060, the hypervisor 210 may check whether a hypervisor 210 is run for each of the processing units.

At step 1070, the hypervisor 210 may check whether hypervisors are operating in all of the processing units. If hypervisors are operating in all of the processing units, step 1080 may be performed. If there is a processing unit in which no hypervisor 210 is operating, step 1060 may be repeated.

For example, when step 1060 is repeated, the hypervisor 210 may be rerun for each of the processing units. Alternatively, in order to wait for the state in which hypervisors operate in all of the processing units, the operating hypervisors may wait for a predefined time at step 1060.

At step 1080, the hypervisors of the processing units may run a virtualized operating system 230 for each of the hypervisors, and may start to control the virtualized operating system 230.

The above-mentioned embodiments according to the present invention may be implemented as program instructions that can be executed by various computer means. In this case, the program instructions may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as CDROM and a DVD, magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

There is provided a method and apparatus that may protect an operating system against malware and detect malware attacks by verifying the integrity of the operating system and detecting threats to the operating system.

There is provided a method and apparatus that may reduce the overhead associated with the use of virtualization technology by using a lightweight hypervisor.

There is provided a method and apparatus that may avoid performance degradation in a virtualized operating system by using a lightweight hypervisor.

There is provided a method and apparatus for detecting a method in which malware alters an operating system and detecting the characteristics of such alteration by using an operating system monitor.

There is provided a method and apparatus that may avoid degradation of the performance of a virtual machine compared to the performance of a physical machine by making full use of the performance of the physical machine in which a processor that includes multiple processing units is installed.

Although the present invention has been described above in connection with specific items, such as detailed elements limited embodiments, and the drawings, they are provided to help the general understanding of the present invention, and the present invention is not limited to the above embodiments. Those skilled in the art can modify the present invention in various ways from the above description.

Accordingly, the scope of the present invention should not be limited to the above-described embodiments, but should be defined within the scope of the appended claims and equivalents thereof.

What is claimed is:

1. An electronic device, comprising:
   memory for storing at least one program; and
   a processor for executing the at least one program,
   wherein the at least one program comprises:
   code of a virtualized operating system; and
   code of a hypervisor,
   code of an operating system monitor,
   wherein the hypervisor runs on an operating system of the electronic device,
   wherein the operating system monitor runs on the operating system of the electronic device for monitoring the virtualized operating system,
   wherein the virtualized operating system runs on a virtual machine,
   the virtualized operating system and an operating system of the electronic device share a resource of the operating system of the electronic device, and
   the hypervisor controls access by the virtualized operating system to the shared resource,
   wherein the operating system monitor checks integrity of the virtualized operating system by monitoring predetermined information, provided by the hypervisor, associated with the virtualized operating system,
   wherein the operating system monitor is run using an execution flow created by the hypervisor that is independent of a scheduler of the operating system, wherein the hypervisor uses a preemptive timer of virtualized technology to create the scheduler-independent execution flow.

2. An operating method of an electronic device, comprising:
   creating, by the electronic device, a hypervisor on an operating system of the electronic device; and
   creating, by the electronic device, a virtualized operating system,
   running an operating system monitor on the operating system of the electronic device for monitoring the virtualized operating system, wherein the virtualized operating system runs on a virtual machine, the virtualized operating system and an operating system of the electronic device share a resource of the operating system of the electronic device, and the hypervisor controls access by the virtualized operating system to the shared resource, wherein the operating system monitor checks integrity of the virtualized operating system by monitoring predetermined information, provided by the hypervisor, associated with the virtualized operating system, wherein the operating system monitor is run using an execution flow created by the hypervisor that is independent of a scheduler of the operating system, wherein the hypervisor uses a preemptive timer of virtualized technology to create the scheduler-independent execution flow.

3. The operating method of claim 2, wherein a processor of the electronic device includes multiple processing units, and each of the multiple processing units executes the hypervisor.

4. The operating method of claim 2, wherein the hypervisor and the virtualized operating system are created in the operating system of the electronic device.

5. The operating method of claim 2, wherein the virtualized operating system provides an environment identical to an environment provided before virtualization to an application that runs inside the virtualized operating system through sharing of the resource.

6. The operating method of claim 2, wherein, in the creating the virtualized operating system, an execution flow in the electronic device continues without interruption from the operating system of the electronic device to an inside of the virtualized operating system.

7. The operating method of claim 2, wherein the predetermined information includes at least one of a state of a register of a processor, a state of memory, and a state of a process.

8. The operating system of claim 2, wherein, if there is a problem with the integrity of the virtualized operating system, the operating system monitor determines whether a threat to the virtualized operating system exists.

9. The operating system of claim 8, wherein the operating system monitor determines whether the threat exists based on information about a behavior of the virtualized operating system.

10. The operating method of claim 2, further comprising:

recognizing access by the virtualized operating system to a predetermined resource of the electronic device;

determining whether to allow the access; and controlling the access based on a result of the determination.

11. The operating method of claim 10, wherein the predetermined resource includes at least one of kernel-level code, kernel-level readable data, kernel-level writable data, kernel-level read-only data, a kernel level table, and a kernel-level register.

12. The operating method of claim 10, wherein whether to allow the access is determined based on at least one of a memory space whitelist, a process whitelist, and information about a state of a process.

13. The operating method of claim 10, wherein the access is recognized by a memory protection function or a register protection function for the resource.

14. The operating method of claim 10, wherein, if the access is determined to be abnormal access, an event is inserted in the virtualized operating system.

15. The operating method of claim 14, wherein the event includes at least one of an exception, an interruption, movement of a code execution address, memory information modification, and register resource modification.

16. The operating method of claim 2, wherein the virtualized operating system runs on a virtual machine, and the virtual machine has an identical environment with a physical machine of the electronic device.

17. The operating method of claim 2, wherein the virtualized operating system is created inside the operating system of the electronic device, and a specialized operating system and a resource for the virtual machine are not required as the virtualized operating system is created inside of the operating system of the electronic device and the virtualized operating system and the operating system of the electronic device share resources for the operating system of the electronic device.

18. A non-transitory computer-readable storage medium in which a program is recorded, the program comprising:

code of a virtualized operating system; and code of a hypervisor, code of an operating system monitor, wherein the hypervisor runs on an operating system of the electronic device, wherein the operating system monitor runs on the operating system of the electronic device for monitoring the virtualized operating system, wherein the virtualized operating system runs on a virtual machine, the virtualized operating system and an operating system of the electronic device share a resource of the operating system of the electronic device, and the hypervisor controls access by the virtualized operating system to the resource, wherein the operating system monitor checks integrity of the virtualized operating system by monitoring predetermined information, provided by the hypervisor, associated with the virtualized operating system, wherein the operating system monitor is run using an execution flow created by the hypervisor that is independent of a scheduler of the operating system, wherein the hypervisor uses a preemptive timer of virtualized technology to create the scheduler-independent execution flow.

* * * * *